(12) United States Patent
Smirnov

(10) Patent No.: US 8,928,196 B2
(45) Date of Patent: Jan. 6, 2015

(54) SPINDLE MOTOR

(71) Applicant: Samsung Electro-Mechanics Co., Ltd., Suwon (KR)

(72) Inventor: Viatcheslav Smirnov, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/795,432

(22) Filed: Mar. 12, 2013

(65) Prior Publication Data

US 2014/0184000 A1 Jul. 3, 2014

(30) Foreign Application Priority Data

Dec. 27, 2012 (KR) ........................ 10-2012-0155297

(51) Int. Cl.
*H02K 5/16* (2006.01)
*H02K 7/08* (2006.01)
*G11B 17/02* (2006.01)

(52) U.S. Cl.
CPC ..................................... *H02K 5/163* (2013.01)
USPC .......................... 310/90; 310/67 R; 360/99.08

(58) Field of Classification Search
USPC ................... 310/67 R, 90; 360/99.08
See application file for complete search history.

(56) References Cited

U.S. PATENT DOCUMENTS

| | | | |
|---|---|---|---|
| 6,664,687 B2 * | 12/2003 | Ichiyama | 310/90.5 |
| 6,939,047 B2 | 9/2005 | Gomyo et al. | |
| 7,201,517 B2 * | 4/2007 | Gomyo et al. | 384/107 |
| 7,521,831 B2 * | 4/2009 | Smirnov et al. | 310/90 |
| 8,179,006 B2 * | 5/2012 | Smirnov | 310/90 |
| 8,213,114 B2 * | 7/2012 | Watanabe et al. | 360/99.08 |
| 8,243,383 B2 * | 8/2012 | Yamada et al. | 360/98.07 |
| 2007/0222314 A1 * | 9/2007 | Drautz | 310/90 |
| 2007/0228851 A1 | 10/2007 | Smirnov et al. | |
| 2011/0115323 A1 | 5/2011 | Jang et al. | |
| 2012/0153781 A1 | 6/2012 | Yoo et al. | |

FOREIGN PATENT DOCUMENTS

| | | |
|---|---|---|
| JP | 2005-291428 | 10/2005 |
| JP | 4422738 | 12/2009 |
| KR | 10-2006-0114883 | 11/2006 |
| KR | 10-1026013 | 3/2011 |
| KR | 10-2012-0069244 | 6/2012 |
| WO | WO 2006/118407 | 11/2006 |

OTHER PUBLICATIONS

Korean Office Action mailed Jan. 13, 2014 in corresponding Korean Application No. 10-2012-0155297.

* cited by examiner

*Primary Examiner* — Burton Mullins

(57) ABSTRACT

There is provided a spindle motor including: a sleeve rotatably supporting a shaft; a rotor coupled to an upper end of the shaft and rotating in conjunction with the shaft; a stopper portion coupled to a main wall portion protruded from one surface of the rotor and facing an outer circumferential surface of the sleeve; a stator holder having a fixed portion coupled to an outer circumferential surface of the sleeve, an installation portion to which a core having a coil wound therearound is fixed, and a connection portion connecting an upper end of the fixed portion and an upper end of the installation portion; and a base member fixedly coupled to the stator holder.

10 Claims, 10 Drawing Sheets

SPINDLE MOTOR

CROSS-REFERENCE TO RELATED APPLICATIONS

This application claims the priority of Korean Patent Application No. 10-2012-0155297 filed on Dec. 27, 2012, in the Korean Intellectual Property Office, the disclosure of which is incorporated herein by reference.

BACKGROUND OF THE INVENTION

1. Field of the Invention

The present invention relates to a spindle motor.

2. Description of the Related Art

A hard disk drive (HDD), an information storage device, is a device for reading data stored on a disc or writing data to a disc with a read/write head.

A hard disk drive requires a disc driving device for driving a disc, and a small spindle motor is used in the disc driving device.

A spindle motor employs a fluid dynamic bearing assembly (or a hydrodynamic bearing assembly), in which a lubricating fluid is interposed between a shaft, a rotary member of the fluid dynamic bearing assembly, and a sleeve, a fixed member of the fluid dynamic bearing assembly, and the shaft is supported by fluid pressure generated in the lubricating fluid.

Spindle motors are required to have high capacity and to be thinned, and as spindle motors are thinned and reduced in size, bearing rigidity is inevitably weakened.

Bearing rigidity is an important factor determining rotational characteristics of spindle motors, affected by an interval between dynamic pressure generating grooves, i.e., a length of a bearing span.

Namely, as the length of the bearing span is increased, bearing rigidity is increased to enhance rotational characteristics of a motor, and thus, even in the case that a motor has high capacity and is thinned, bearing rigidity may not be affected.

Also, a lubricating fluid injected into a fluid dynamic bearing assembly may be leaked to the outside thereof, or an amount of the lubricating fluid may be reduced due to evaporation, reducing pressure generation in a fluid dynamic bearing and leading to a problem with performance and a life span of the spindle motor.

Thus, research into a spindle motor that may have high capacity and be thin without degrading bearing rigidity, have rigidity sufficient to allow an internal component thereof to resist deformation in spite of external impacts applied thereto, and have performance and life span maximized by securing a storage space of a lubricating fluid is urgently required to be conducted.

SUMMARY OF THE INVENTION

An aspect of the present invention provides a spindle motor having enhanced rigidity, having enhanced bearing rigidity in spite of being small and thin, able to prevent leakage of a lubricating fluid, and having a lengthened lifespan.

Another aspect of the present invention provides a spindle motor having a reduced amount of internal components, simplifying a manufacturing process and reducing manufacturing costs.

According to an aspect of the present invention, there is provided a spindle motor including: a sleeve rotatably supporting a shaft; a rotor coupled to an upper end of the shaft and rotating in conjunction with the shaft; a stopper portion coupled to a main wall portion protruded from one surface of the rotor and facing an outer circumferential surface of the sleeve; a stator holder having a fixed portion coupled to an outer circumferential surface of the sleeve, an installation portion to which a core having a coil wound therearound is fixed, and a connection portion connecting an upper end of the fixed portion and an upper end of the installation portion; and a base member fixedly coupled to the stator holder.

The base member may have a disk portion and a coupling portion extending from an inner end of the disk portion upwardly in an axial direction.

An inner circumferential surface of the coupling portion may be coupled to an outer circumferential surface of the fixed portion.

An accommodation recess may be formed between the fixed portion and the installation portion such that the accommodation portion is caved in upwardly in the axial direction.

The base member may have a coupling portion extending from an inner end of the disk portion upwardly in the axial direction, and the coupling portion may be fixedly disposed in the accommodation recess.

A fluid-air interface of a lubricating fluid may be formed between an outer circumferential surface of the sleeve and an inner circumferential surface of the stopper portion.

The outer circumferential surface of the sleeve and the inner circumferential surface of the stopper portion may be tapered to seal a lubricating fluid therebetween.

A micro-gap may be formed between a lower surface of the stopper portion and an upper surface of the connection portion and widened outwardly in a radial direction.

The stator holder may further include a bent portion extending from a lower end of the installation portion outwardly in the radial direction.

The stator holder may further include an outer wall portion extending from an outer end of the connection portion upwardly in the axial direction.

According to another aspect of the present invention, there is provided a spindle motor including: a shaft having a body portion, an extending portion extending from an upper portion of the body portion outwardly in a radial direction, and a protrusion portion extending from an outer end of the extending portion in an axial direction; a sleeve rotatably supporting the shaft; a rotor coupled to the extending portion so as to be rotatable in conjunction with the shaft; a stopper portion coupled to the protrusion portion and facing an outer circumferential surface of the sleeve; and a stator holder having a fixed portion coupled to an outer circumferential surface of the sleeve, an installation portion to which a core having a coil wound therearound is fixed, and a connection portion connecting an upper end of the fixed portion and an upper end of the installation portion.

A micro-gap may be formed between a lower surface of the stopper portion and an upper surface of the connection portion and widened outwardly in the radial direction.

A fluid-air interface of a lubricating fluid may be formed between a lower surface of the stopper portion and an upper surface of the connection portion.

The lower surface of the stopper portion and the upper surface of the connection portion may be tapered to seal a lubricating fluid therebetween.

The stator holder may further include a bent portion extending from a lower end of the installation portion outwardly in the radial direction.

According to another aspect of the present invention, there is provided a spindle motor including: a shaft having a body portion, an extending portion extending from an upper portion of the body portion outwardly in a radial direction, and a protrusion portion extending from an outer end of the extending portion in an axial direction; a sleeve rotatably supporting the shaft; a rotor having a hub base coupled to the extending portion so as to be rotatable in conjunction with the shaft and a stopper portion extending from the hub base to face an outer circumferential surface of the sleeve; and a stator holder having a fixed portion coupled to an outer circumferential surface of the sleeve, an installation portion to which a core having a coil wound therearound is fixed, and a connection portion connecting an upper end of the fixed portion and an upper end of the installation portion.

The stator holder may further include a bent portion extending from a lower end of the installation portion outwardly in the radial direction.

The stator holder may further include a support portion extending from an upper end of the installation portion outwardly in the radial direction.

A first sealing recess may be formed on an upper surface of the connection portion and depressed inwardly.

A second sealing recess may be formed on a surface of the stopper portion disposed to face an upper surface of the connection portion and depressed inwardly.

According to another aspect of the present invention, there is provided a spindle motor including: a shaft having a body portion, an extending portion extending from an upper portion of the body portion outwardly in a radial direction, and a protrusion portion extending from an outer end of the extending portion in an axial direction; a sleeve rotatably supporting the shaft; a rotor coupled to the extending portion so as to be rotatable in conjunction with the shaft; a stopper portion coupled to the protrusion portion and facing an outer circumferential surface of the sleeve; and a stator holder having a cover portion disposed below the sleeve such that a gap is maintained between the cover portion and a lower portion of the sleeve, a fixed portion coupled to an outer circumferential surface of the sleeve, an installation portion to which a core having a coil wound therearound is fixed, and a connection portion connecting an upper end of the fixed portion and an upper end of the installation portion.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
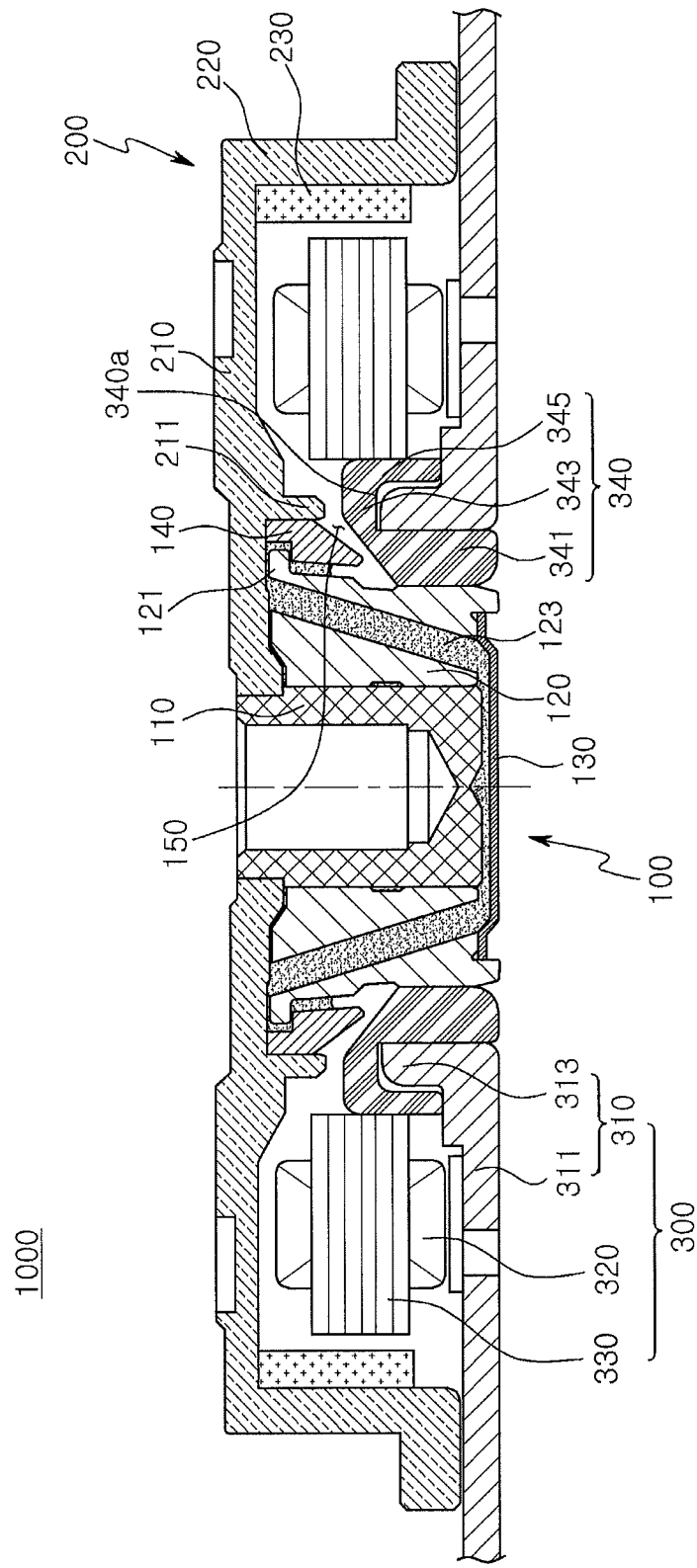
FIG. 1 is a schematic cross-sectional view of a spindle motor according to a first embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
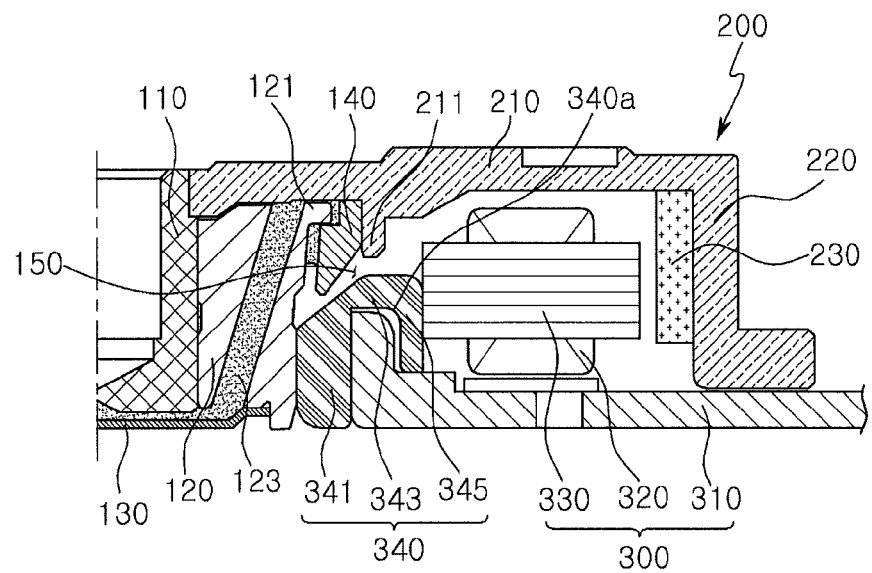
FIG. 2 is a cross-sectional view of half of the spindle motor according to the first embodiment of the present invention.

FIG. 1 is a schematic cross-sectional view of a spindle motor according to a first embodiment of the present invention. FIG. 2 is a cross-sectional view of half of the spindle motor according to the first embodiment of the present invention.

Figure 3:
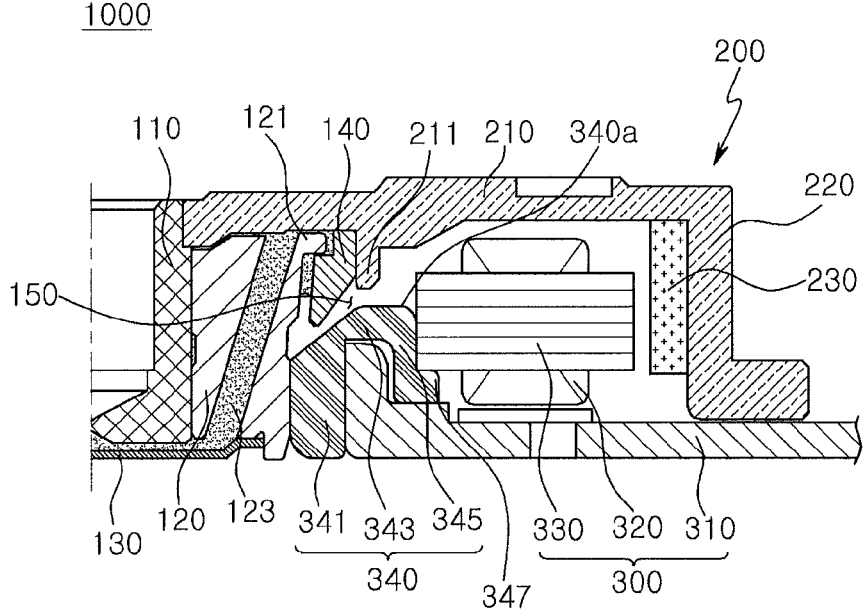
FIG. 3 is a cross-sectional view of half of the spindle motor illustrating a modification of a stator holder provided in the spindle motor according to the first embodiment of the present invention.
Figure 4:
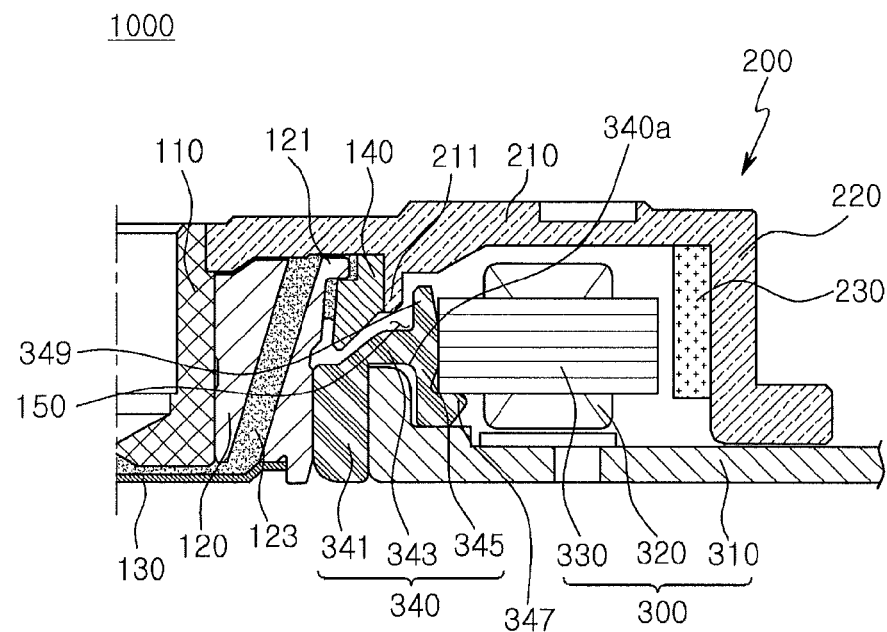
FIG. 4 is a cross-sectional view of half of the spindle motor illustrating another modification of a stator holder provided in the spindle motor according to the first embodiment of the present invention.
Figure 5:
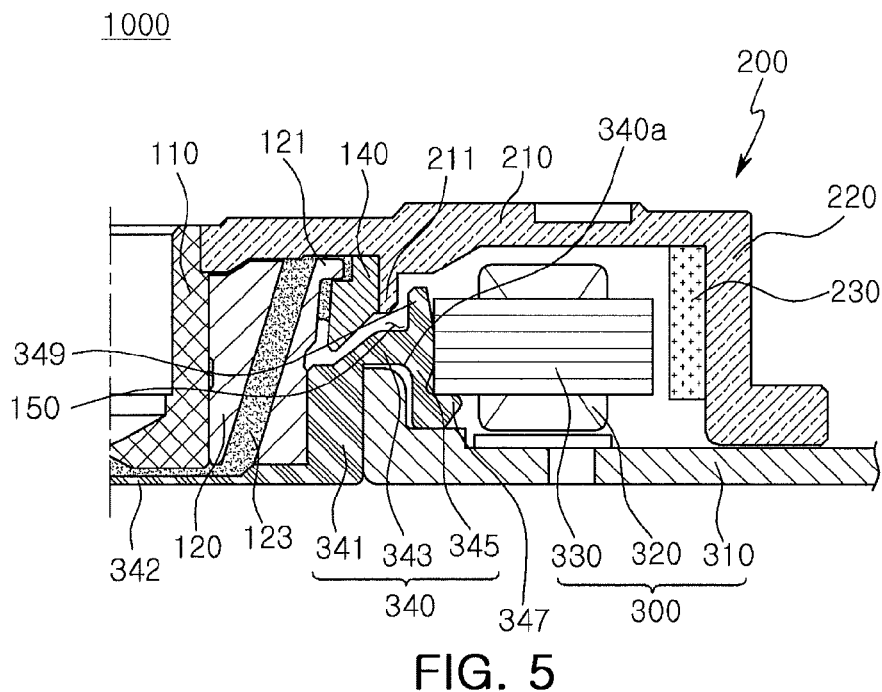
FIG. 5 is a cross-sectional view of half of the spindle motor in which a stator holder and a cover plate are integrally formed according to the first embodiment of the present invention.

FIG. 3 is a cross-sectional view of half of the spindle motor illustrating a modification of a stator holder provided in the spindle motor according to the first embodiment of the present invention;

FIG. 4 is a cross-sectional view of half of the spindle motor illustrating another modification of a stator holder provided in the spindle motor according to the first embodiment of the present invention. FIG. 5 is a cross-sectional view of half of the spindle motor in which a stator holder and a cover plate are integrally formed according to the first embodiment of the present invention.

Referring to FIGS. 1 through 5, a spindle motor 1000 according to a first embodiment of the present invention may include a fluid dynamic bearing assembly 100, a stator 300 as a fixed member, and a rotor 200 as a rotating member.

First, referring to definitions of directional terms, an axial direction may refer to a vertical direction based on a shaft 110, and an outer and inner radial direction may refer to an outer edge direction of the a rotor 200 based on the shaft 110 or a central direction of the shaft 110 based on an outer edge of the rotor 200, respectively.

The fluid dynamic bearing assembly 100 may include a shaft 110, a sleeve 120, and a cover plate 130.

The shaft 110 may be a rotating member rotating in conjunction with the rotor 200.

The shaft may be inserted in a shaft hole of the sleeve 120 such that an upper end thereof is protruded, and the rotor 200 may be coupled to the upper end of the shaft 110 so as to be rotated in conjunction with the shaft 110.

The sleeve 120 may be formed by forging copper (Cu) or aluminum (Al) or sintering Cu—Fe-based alloy powder or SUS-based powder.

Here, the shaft 110 is inserted to have a micro-gap (or a micro-clearance) with regard to a shaft hole of the sleeve 120, and a lubricating fluid is charged in the micro-gap. A rotation of the shaft 110 may be more smoothly supported by radial dynamic pressure generating grooves (not shown) formed on at least one of the outer diameter of the shaft 110 and an inner diameter of the sleeve 120.

The radial dynamic pressure generating grooves (not shown) may be formed on an inner circumferential surface of the sleeve 120, i.e., the interior of the shaft hole of the sleeve 120, and form pressure allowing the shaft 110 to be spaced apart from the inner circumferential surface of the sleeve 120 by a certain interval so as to rotate smoothly.

However, without being limited to the configuration in which the radial dynamic pressure generating grooves (not shown) are formed on the inner circumferential surface of the sleeve 120 as mentioned above, the radial dynamic pressure generating grooves (not shown) may be provided on an outer circumferential surface of the shaft 110 and an amount of the radial dynamic pressure generating grooves is not limited.

The radial dynamic pressure generating grooves (not shown) may have any one of a herringbone pattern, a spiral pattern, and a helical pattern, and the shape of the radial dynamic pressure generating grooves is not limited as long as it can generate radial dynamic pressure.

Also, thrust dynamic pressure grooves (not shown) may be formed on at least one of an upper surface of the sleeve 120 and one surface of the extending portion of the shaft 110 facing the upper surface of the sleeve 120. By virtue of the thrust dynamic pressure grooves (not shown), the shaft 110 may rotate in conjunction with the rotor 200, while maintaining a predetermined degree of levitation force.

Here, like the radial dynamic pressure grooves (not shown), the thrust dynamic pressure grooves (not shown) may have a herringbone pattern, a spiral pattern, or a helical pattern, but the present invention is not limited thereto and the thrust dynamic pressure grooves (not shown) may have any shape as long as it can provide thrust dynamic pressure.

Also, at least one bypass flow channel 123 may be formed in the sleeve 120 and connect upper and lower portions of the sleeve 120.

The bypass flow channel 123 may disperse pressure of a lubricating fluid to balance it, and allow bubbles existing within the lubricating fluid to move so as to be expelled through circulation.

The cover plate 130 may be coupled to the sleeve, while maintaining a gap with regard to lower portions of the shaft 110 and the sleeve 120.

The cover plate 130 may support a lower surface of the shaft 110 by accommodating a lubricating fluid in the gap formed between the cover plate 130 and the sleeve 120.

Here, the cover plate 130 may be fixed according to various methods such as welding, caulking, bonding, or the like. A method of fixing the cover plate 130 may be selectively applied according to a structure and a process of a product.

A specific shape of the cover plate 130 will be described later.

The stator 300 may include a coil 320, a core 330, a base member 310, and a stator holder 340.

The stator 300 is a fixed structure having the core 330 around which the coil 320 generating electromagnetic force having a predetermined magnitude when power is applied thereto is wound.

The core 330 may be fixedly disposed on a base member 310 in which a printed circuit board (PCB) (not shown) with a pattern circuit printed thereon is provided. A plurality of coil holes having a predetermined size may be formed in a penetrative manner in an upper surface of the base member 310 corresponding to the core 330 around which the coil 320 is wound, such that the coil is exposed downwardly. The coil 320 may be electrically connected to the PCB (not shown) such that external power is applied thereto.

The base member 310 may include a disk portion 311 and a coupling portion 313 extending upwardly in the axial direction from an inner end of the disk portion 311.

The base member 310 may be made of aluminum (Al) and formed through a die-casting method. The base member 310 may be fabricated by performing plastic working (or press working) on a steel sheet.

The stator holder 340 may include a fixed portion 341 coupled to the sleeve 120 and a coupling portion 313 of the base member 310, an installation portion 345 to which the core 330 is fixed, and a connection portion 343 connecting an upper end of the fixed portion 341 and an upper end of the installation portion 345.

Thus, an accommodation recess 340a caved in upwardly in the axial direction may be formed between the fixed portion 341 and the installation portion 345, and the coupling portion 313 of the base member 310 may be disposed in the accommodation recess 340a.

An inner circumferential surface of the fixed portion 341 may be coupled to an outer circumferential surface of the sleeve 120, and an outer circumferential surface of the fixed portion 341 may be coupled to an inner circumferential surface of the coupling portion 313 of the base member 310.

The core 330 may be fixedly disposed on an outer circumferential surface of the installation portion 345.

The connection portion 3443 may connect the upper end of the fixed portion 341 and the upper end of the installation portion 345, and an upper surface of the connection portion 343 may face a lower surface of the stopper portion 140 as described hereinafter.

The upper surface of the connection portion 343 and the lower surface of the stopper portion 140 disposed to face the upper surface of the connection portion 343 may be sloped. In detail, the upper surface of the connection portion 343 and the lower surface of the stopper portion 140 disposed to face the upper surface of the connection portion 343 may be sloped upwardly and outwardly in the radial direction.

Here, as illustrated in FIG. 3, in order to enhance pulling force (or drawing force) of the core 330 fixedly coupled to the installation portion 345, the stator holder 340 may further include a bent portion 347 extending from a lower end of the installation portion 345 outwardly in the radial direction.

The core 330 around which the coil 320 is wound is mounted on the installation portion 345 and a step formed by the bent portion 347, a contact area between the core 330 and the stator holder 340 may be increased (namely, an area in which the core 330 and the stator holder 340 are in contact), and thus, a pulling-out force of the core 330 may be enhanced.

Also, as illustrated in FIG. 4, the stator holder 340 may further include an outer wall portion 349 extending from an outer end of the connection portion 343 upwardly in the axial direction.

A contact area of the core 330 and the stator holder 340 and the stator holder 340 can be increased, and thus, pulling-out force of the core 330 can be further enhanced.

Since the fixed portion 341, the connection portion 343, and the installation portion 345 of the stator holder 340 are disposed between the sleeve 120 and the base member 310 to support the sleeve 120 and the base member 310, even in the case that there is a load or external impacts applied in the axial direction or the radial direction, internal components are prevented from being deformed.

Thus, rigidity of the spindle motor can be enhanced.

Meanwhile, a micro-gap may be formed between the stopper portion 140 and the connection portion 343 and between the main wall portion 211 of the rotor 200 and the outer wall portion 349, whereby a labyrinth sealing portion 150 may be formed.

A micro-gap formed between a lower surface of the stopper portion 140 and an upper surface of the connection portion 343 may be widened outwardly in the radial direction.

Thus, a sealing effect of a lubricating fluid can be enhanced by the labyrinth sealing portion 150.

In detail, the labyrinth sealing portion 150 may restrain air containing an evaporated lubricating fluid from being leaked outwardly, preventing the lubricating fluid from being reduced and preventing an external foreign object from being introduced.

The rotor 200 may be a rotating structure which is rotatably provided with respect to the stator 300. The rotor 200 may have an annular magnet 220 formed on an inner circumferential surface thereof. The annular magnet 220 may correspond to the core 330 with a predetermined space therebetween.

Here, the rotor 200 may include a hub base 210 coupled to an upper end of the shaft 110 and a magnet support portion 220 bent downwardly from the hub base 210 in an axial direction and supporting the magnet 230.

The magnet 230 may be provided as a permanent magnet having an N pole and an S pole alternately magnetized in the circumferential direction to generate magnetic force having a predetermined magnitude.

A rotational driving of the rotor 200 will be described briefly. When power is supplied to the coil 320 wound around the core 330, driving force (or power) is generated, allowing the rotor 200 to rotate according to electromagnetic interaction between the magnet 230 and the core 330 with the coil 320 wound therearound.

Accordingly, the rotor 200 rotates, and accordingly, the shaft 110 to which the rotor 200 is fixedly coupled is rotated in conjunction with the rotor 200.

The rotor 200 may include the main wall portion 211 protruded from one surface of the rotor 200 downwardly in the axial direction.

The stopper portion 140 may be coupled to an inner circumferential surface of the main wall portion 211, and the stopper portion 140 may be disposed such that an inner circumferential surface thereof faces an outer circumferential surface of the sleeve 120.

A fluid-air interface of a lubricating fluid may be formed between an outer circumferential surface of the sleeve 120 and an inner circumferential surface of the stopper 140 to seal the lubricating fluid.

Namely, the main wall portion 211 is protruded from one surface of the rotor 200 as a rotary member and allows the stopper portion 140 to be fixed to an inner circumferential surface thereof, and a lubricating fluid may be sealed between the stopper portion 140 as a rotary member and the sleeve 120 as a fixed member.

The inner circumferential surface of the stopper portion 140 and the outer circumferential surface of the sleeve 120 may be formed to be tapered to allow the lubricating fluid to be sealed therebetween.

Also, the sleeve 120 may have a flange portion 121 formed on an upper portion thereof. The flange portion 121 may be protruded in an outer radial direction, and a lower surface of the flange portion 121 may face a portion of an upper surface of the stopper portion 140.

Thus, when the shaft 110 and the rotor 200, rotating members, float excessively, a portion of the upper surface of the stopper portion 240 is caught by the flange portion 121, preventing the rotating members from floating excessively.

Figure 6:
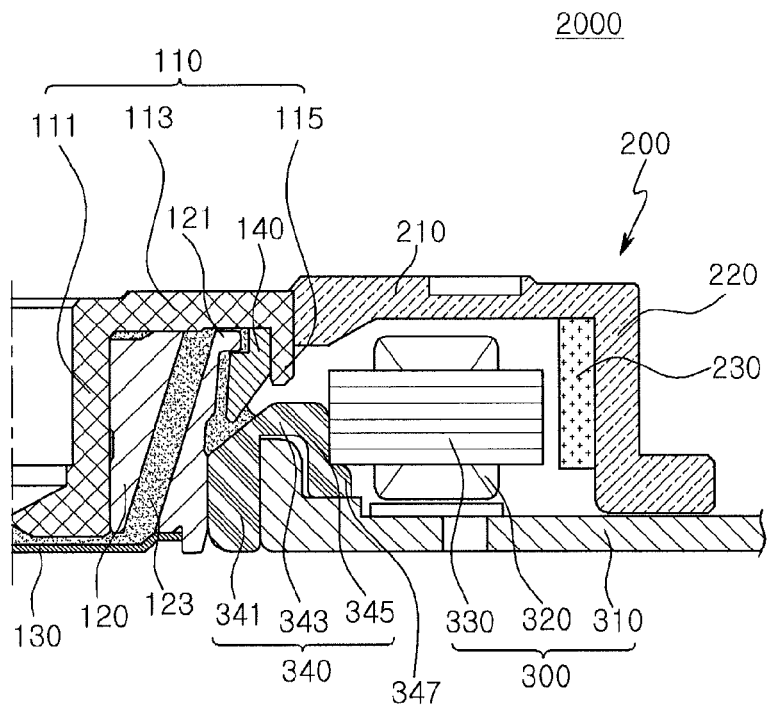
FIG. 6 is a cross-sectional view of half of a spindle motor according to a second embodiment of the present invention.
Figure 7:
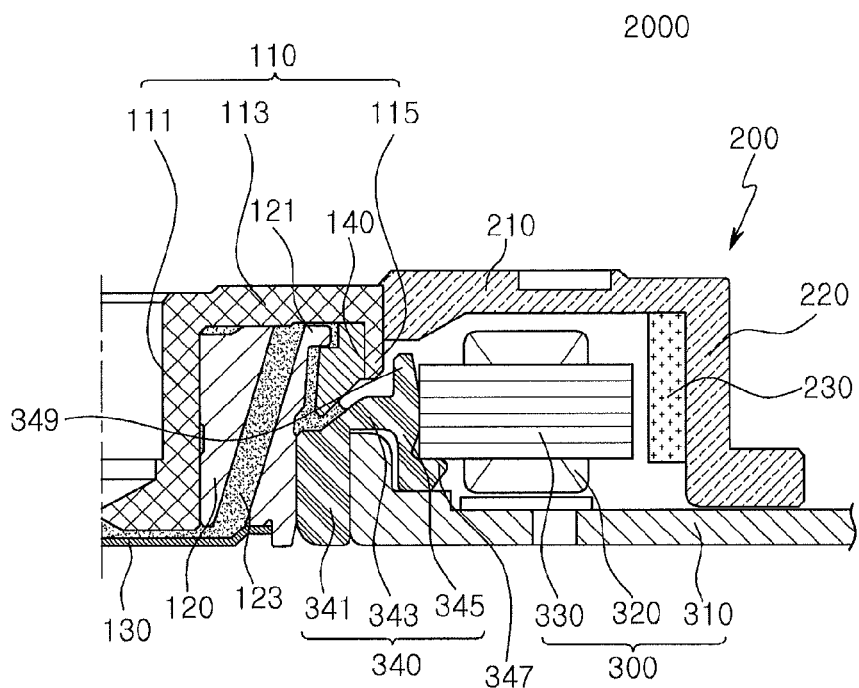
FIG. 7 is a cross-sectional view of half of the spindle motor illustrating a modification of a stator holder provided in the spindle motor according to the second embodiment of the present invention.
Figure 8:
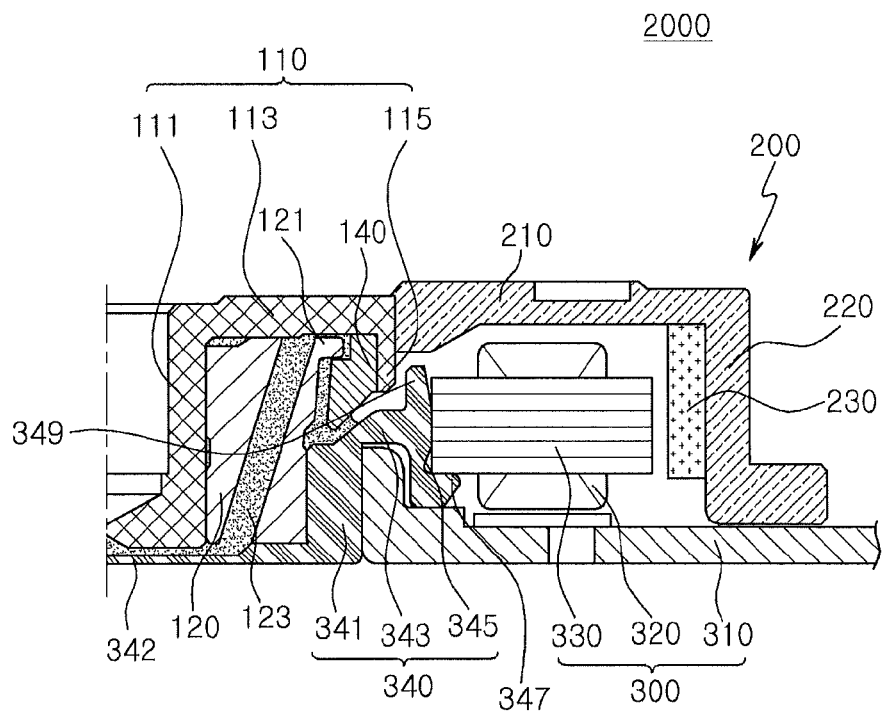
FIG. 8 is a cross-sectional view of half of the spindle motor in which a stator holder and a cover plate are integrally formed according to the second embodiment of the present invention.

FIG. 6 is a cross-sectional view of half of a spindle motor according to a second embodiment of the present invention. FIG. 7 is a cross-sectional view of half of the spindle motor illustrating a modification of a stator holder provided in the spindle motor according to the second embodiment of the present invention. FIG. 8 is a cross-sectional view of half of the spindle motor in which a stator holder and a cover plate are integrally formed according to the second embodiment of the present invention.

Referring to FIGS. 6 through 8, a spindle motor 2000 according to the second embodiment of the present invention is the same as the spindle motor 1000 according to the first embodiment of the present invention, except for the shaft 110, the rotor 200, and a position in which the fluid-air interface of a lubricating fluid is formed, so a description of components other than the shaft 110, the rotor 200, and the fluid-air interface of a lubricating fluid will be omitted.

The shaft 110 may include a body portion 111 inserted into the shaft hole of the sleeve 120 and an extending portion 113 extending from an upper end of the body portion 111 outwardly in the radial direction.

Here, the extending portion 113 may be provided such that an outer end thereof is formed on an outer side, relative to an outer circumferential surface of the sleeve 120, and the outer end of the extending portion may be coupled to the rotor 200.

Thus, the extending portion 113 and the rotor 200 may be coupled at an outer side, relative to the outer circumferential surface of the sleeve 120, in the radial direction.

Here, the shaft 110 may further include a protrusion portion 115 extending from the outer end of the extending portion 113 in the axial direction in order to increase a coupling area with respect to the rotor 200.

Namely, since an outer circumferential surface of the extending portion 113 and an outer circumferential surface and a lower surface of the protrusion portion 115 are in contact and coupled with the rotor 200, a coupling area of the shaft 110 and the rotor 200 may be increased, enhancing binding strength (or coupling force) of the shaft 110 and the rotor 200.

Thus, since the shaft 110 and the rotor 200 are stably coupled, rigidity of the spindle motor can be enhanced.

Also, the stopper portion 140 may be coupled to the protrusion portion 115 of the shaft 110, and an inner circumferential surface of the stopper portion 140 may face an outer circumferential surface of the sleeve 120.

Also, in the spindle motor 2000 according to the second embodiment of the present invention, a fluid-air interface of a lubricating fluid may be formed to seal a lubricating fluid between stopper portion 140 and the connection portion 343 of the stator holder 340.

Here, a lower surface of the stopper portion 140 and an upper surface of the connection portion 343 may face one another, and in this case, the lower surface of the stopper portion 140 and the upper surface of the connection portion 343 may be tapered.

Namely, the lower surface of the stopper portion 140 and the upper surface of the connection portion 343 may be sloped upwardly and outwardly in the radial direction, so a lubricating fluid may be sealed between the lower surface of the stopper portion 140 and the upper surface of the connection portion 343.

Thus, a storage space of the lubricating fluid can be sufficiently secured.

While the spindle motor is being driven, the lubricating fluid may be gradually reduced due to factors such as leakage or evaporation, or the like, thereof, so sufficient fluid pressure may not be provided to seriously negatively affect the driving of the spindle motor.

However, in the spindle motor 2000 according to the second embodiment of the present invention, since the fluid-air interface of the lubricating fluid is formed to seal the lubricating fluid between the lower surface of the stopper portion 140 and the upper surface of the connection portion 343, a storage space of the lubricating fluid can be sufficiently secured, resultantly lengthening a lifespan of the spindle motor.

Also, in a case in which the fluid-air interface of the lubricating fluid moves inwardly in the radial direction according to evaporation of the lubricating fluid, even if the lubricating fluid is separated from the fluid-air interface and leaked due to an external impacts, or the like, the lubricating fluid may be sealed anew by the sloped structure present in the outer side.

Thus, leakage of the lubricating fluid can be effectively prevented.

Figure 9:
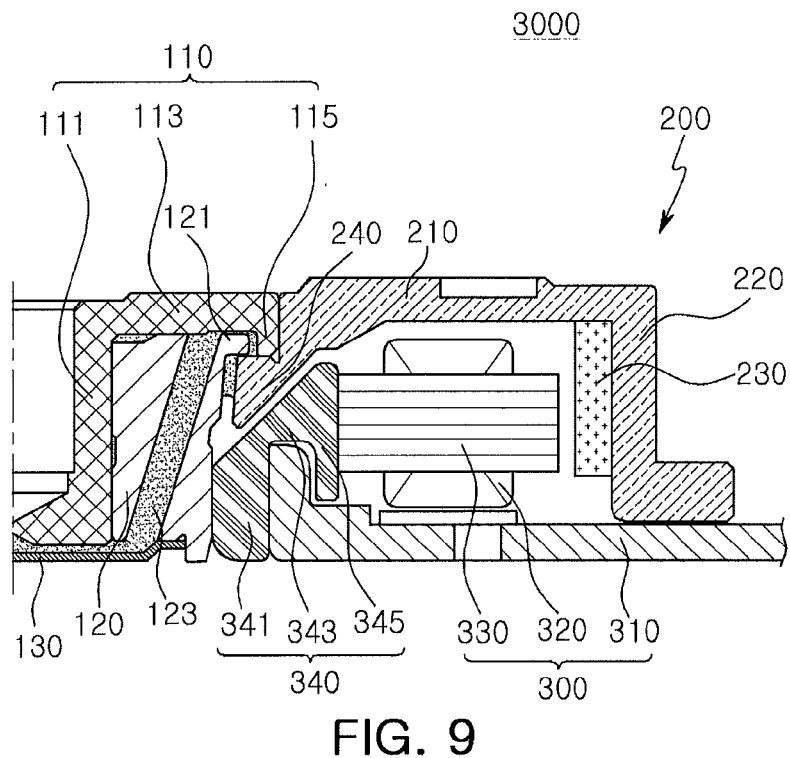
FIG. 9 is a cross-sectional view of half of a spindle motor according to a third embodiment of the present invention.
Figure 10:
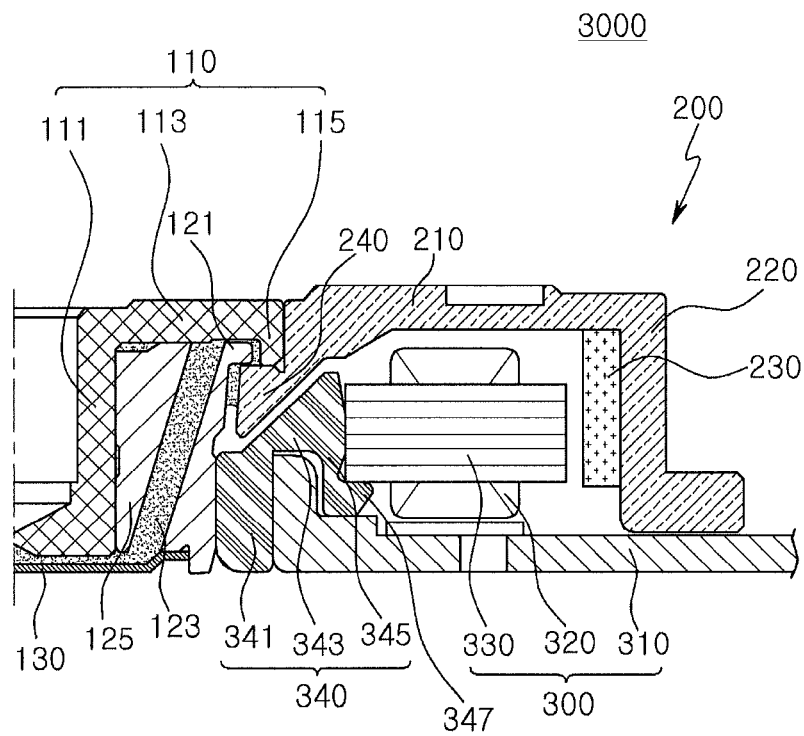
FIG. 10 is a cross-sectional view of half of the spindle motor illustrating a modification of a stator holder provided in the spindle motor according to the third embodiment of the present invention.
Figure 11:
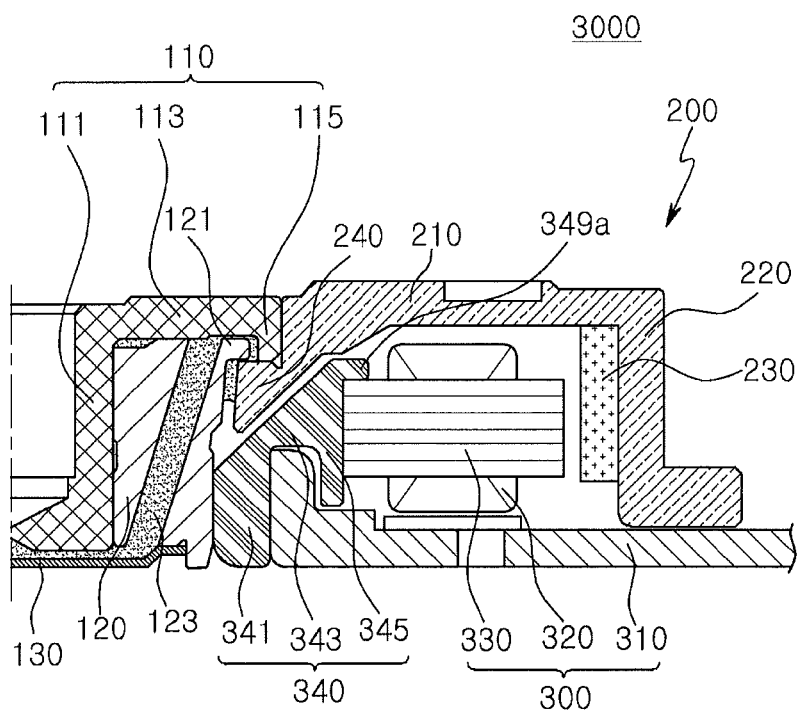
FIG. 11 is a cross-sectional view of half of the spindle motor illustrating another modification of a stator holder provided in the spindle motor according to the third embodiment of the present invention.
Figure 12:
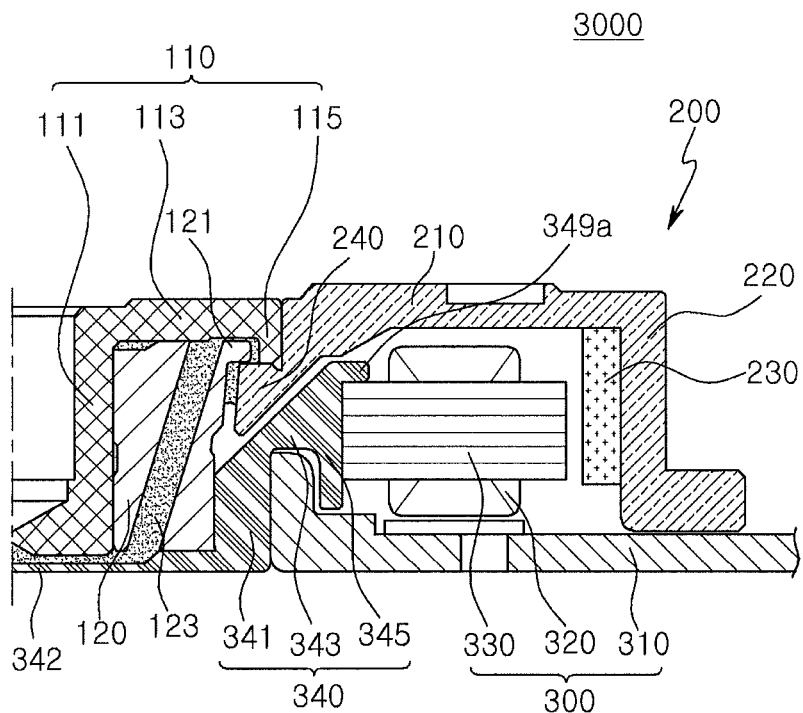
FIG. 12 is a cross-sectional view of half of the spindle motor in which a stator holder and a cover plate are integrally formed according to the third embodiment of the present invention.

FIG. 9 is a cross-sectional view of half of a spindle motor according to a third embodiment of the present invention. FIG. 10 is a cross-sectional view of half of the spindle motor illustrating a modification of a stator holder provided in the spindle motor according to the third embodiment of the present invention. FIG. 11 is a cross-sectional view of half of the spindle motor illustrating another modification of a stator holder provided in the spindle motor according to the third embodiment of the present invention. FIG. 12 is a cross-sectional view of half of the spindle motor in which a stator holder and a cover plate are integrally formed according to the third embodiment of the present invention.

Referring to FIGS. 9 through 12, a spindle motor 3000 according to the third embodiment of the present invention is the same as the spindle motor 1000 according to the first embodiment of the present invention, except for the shaft 110, the rotor 200, and a stopper portion 240, so a description of components other than the shaft 110, the rotor 200, and the stopper portion 240 will be omitted.

The shaft 110 may include a body portion 111 inserted into the shaft hole of the sleeve 120 and an extending portion 113 extending from an upper end of the body portion 111 outwardly in the radial direction.

Here, the extending portion 113 may be provided such that an outer end thereof is formed on an outer side, relative to an outer circumferential surface of the sleeve 120, and the outer end of the extending portion may be coupled to the rotor 200.

Thus, the extending portion 113 and the rotor 200 may be coupled at an outer side, relative to the outer circumferential surface of the sleeve 120, in the radial direction.

Here, the shaft 110 may further include a protrusion portion 115 extending from the outer end of the extending portion 113 in the axial direction in order to increase a coupling area with respect to the rotor 200.

Namely, since an outer circumferential surface of the extending portion 113 and an outer circumferential surface and a lower surface of the protrusion portion 115 are in contact and coupled with the rotor 200, a coupling area of the shaft 110 and the rotor 200 may be increased, enhancing binding strength of the shaft 110 and the rotor 200.

Thus, since the shaft 110 and the rotor 200 are stably coupled, rigidity of the spindle motor can be enhanced.

The rotor 200 may be a rotating structure which is rotatably provided with respect to the stator 300. The rotor 200 may have an annular magnet 220 formed on an inner circumferential surface thereof. The annular magnet 220 may correspond to the core 330 with a predetermined space therebetween.

Here, the rotor 200 may include a hub base 210 coupled to the extending portion 113 of the shaft 110 and a magnet support portion 220 bent downwardly from the hub base 210 in an axial direction and supporting the magnet 230.

The magnet 230 may be provided as a permanent magnet having an N pole and an S pole alternately magnetized in the circumferential direction to generate magnetic force having a predetermined magnitude.

The stopper portion 240 may extend from the hub base 210 and face an outer circumferential surface of the sleeve 120.

Since the rotor 200 and the stopper portion 240 are integrally formed, the amount of the internal components of the spindle motor can be reduced, simplifying the manufacturing process and reducing manufacturing costs.

A fluid-air interface of a lubricating fluid may be formed to seal a lubricating fluid between an inner circumferential surface of the stopper portion 240 and an outer circumferential surface of the sleeve 120.

The inner circumferential surface of the stopper portion 240 and the outer circumferential surface of the sleeve 120 corresponding to the inner circumferential surface of the stopper portion 240 may be sloped to allow the lubricating fluid to be sealed therebetween.

Here, a flange portion 121 may be provided to be protruded outwardly in the radial direction, and a lower surface of the flange portion 121 may face a portion of an upper surface of the stopper portion 240.

Thus, when the shaft 110 and the rotor 200, rotating members, float excessively, a portion of the upper surface of the stopper portion 240 is caught by the flange portion 121, preventing the rotating members from floating excessively.

Meanwhile, as illustrated in FIG. 11, the stator holder 340 may further include a support portion 349a extending from an upper end of the connection portion 343 outwardly in the radial direction.

The core 330 is fixed to a lower surface of the support portion 349a and an outer circumferential surface of the installation portion 345, increasing a contact area of the core 330 and the stator holder 340, and thus, enhancing pulling force of the core 330.

Figure 13:
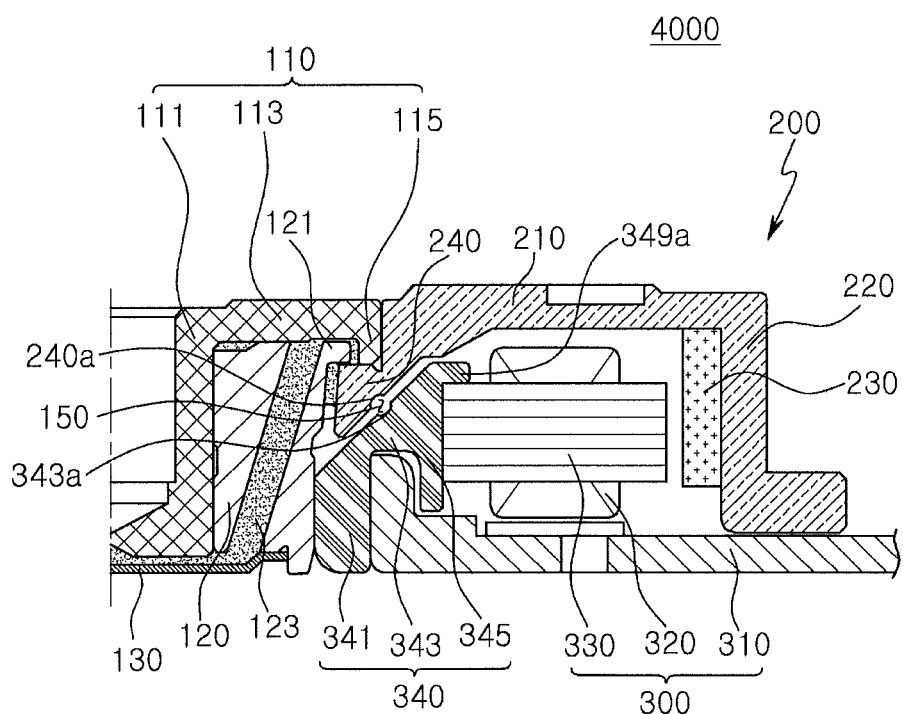
FIG. 13 is a cross-sectional view of half of a spindle motor according to a fourth embodiment of the present invention.
Figure 14:
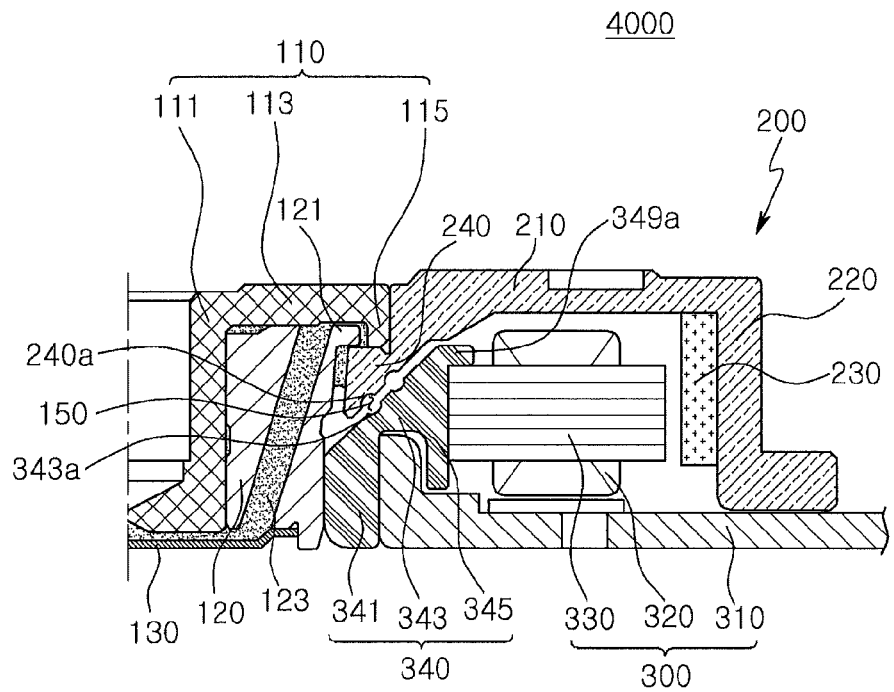
FIG. 14 is a cross-sectional view of half of the spindle motor illustrating an modification of a labyrinth sealing unit provided in the spindle motor according to the fourth embodiment of the present invention.
Figure 15:
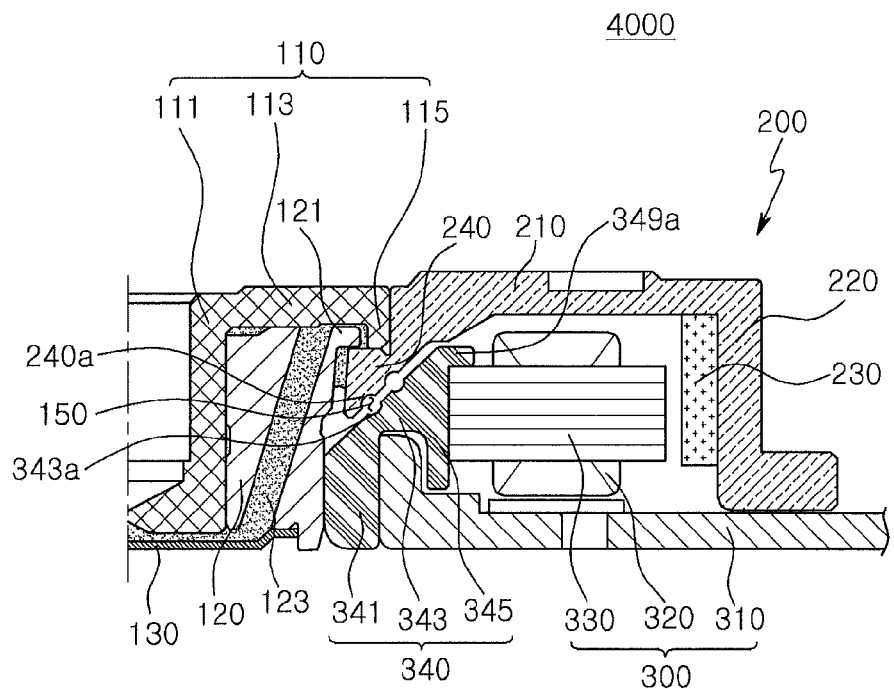
FIG. 15 is a cross-sectional view of half of the spindle motor illustrating another modification of a labyrinth sealing unit provided in the spindle motor according to the fourth embodiment of the present invention.
Figure 16:
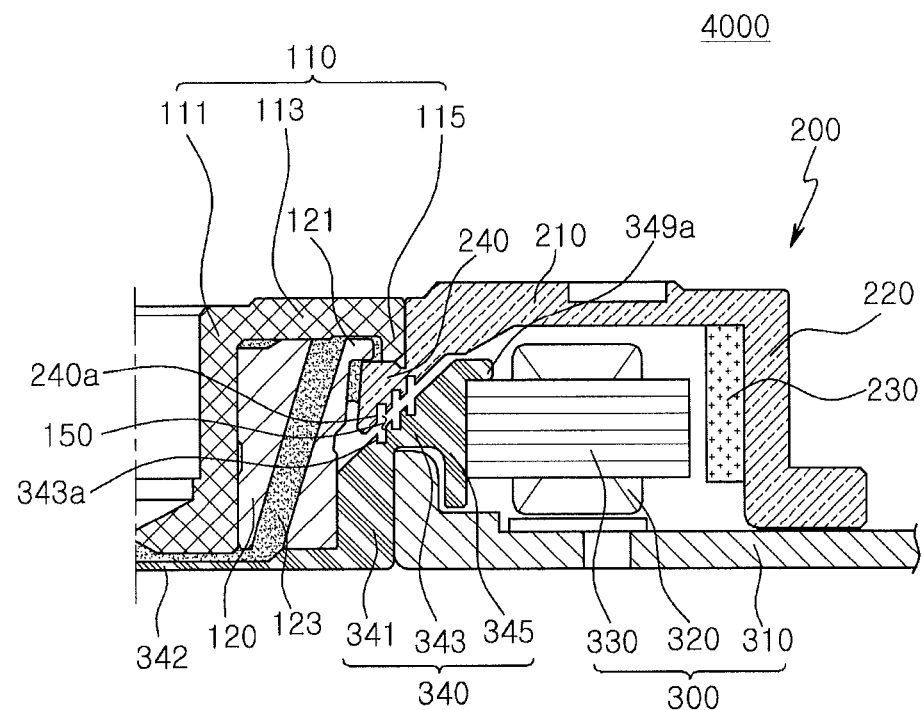
FIG. 16 is a cross-sectional view of half of the spindle motor in which a stator holder and a cover plate are integrally formed according to the fourth embodiment of the present invention.

FIG. 13 is a cross-sectional view of half of a spindle motor according to a fourth embodiment of the present invention. FIG. 14 is a cross-sectional view of half of the spindle motor illustrating a modification of a labyrinth sealing unit provided in the spindle motor according to the fourth embodiment of the present invention. FIG. 15 is a cross-sectional view of half of the spindle motor illustrating another modification of a labyrinth sealing unit provided in the spindle motor according to the fourth embodiment of the present invention. FIG. 16 is a cross-sectional view of half of the spindle motor in which a stator holder and a cover plate are integrally formed according to the fourth embodiment of the present invention.

Referring to FIGS. 13 through 16, a spindle motor 4000 according to the fourth embodiment of the present invention is the same as the spindle motor 3000 according to the third embodiment of the present invention, except for the labyrinth sealing portion 150, so a description of components other than the labyrinth sealing portion 150 will be omitted.

The labyrinth sealing portion 150 may be formed between the stopper portion 240 and the connection portion 343.

To this end, a first sealing recess 343a may be formed on an upper surface of the connection portion 343 such that it is depressed inwardly, and in this case, the first sealing recess 343a may have a hemispherical shape.

Also, a second sealing recess 240a may be formed on one surface of the stopper portion 240 facing the upper surface of the connection portion 343, such that it is depressed inwardly. The second sealing recess 240a may also have a hemispherical shape.

However, as illustrated in FIG. 14, a plurality of first and second sealing recesses 340a and 240a may be formed on the connection portion 343 and the stopper portion 240, respectively, and as illustrated in FIG. 15, the first and second sealing recesses 343a and 240a may be formed as quadrangular recesses, rather than having a hemispherical shape.

However, the shape of the first and second sealing recesses 340a and 240a is not limited to a hemispherical shape or a rectangular shape and the first and second sealing recesses 340a and 240a may have any shape as long as a labyrinth sealing effect can be obtained thereby.

Due to the presence of the first and second sealing recesses 340a and 240a, an extending space is formed between the upper surface of the connection portion 343 and the stopper portion 240 to serve as the labyrinth sealing portion 150.

Thus, as air introduced to the relatively small space meets the extending space, a flow rate thereof is rapidly reduced, resultantly enhancing a sealing effect.

Namely, the labyrinth sealing portion 150 may restrain air containing an evaporated lubricating fluid from being leaked outwardly, preventing the lubricating fluid from being reduced and preventing an external foreign object from being introduced.

Figure 17:
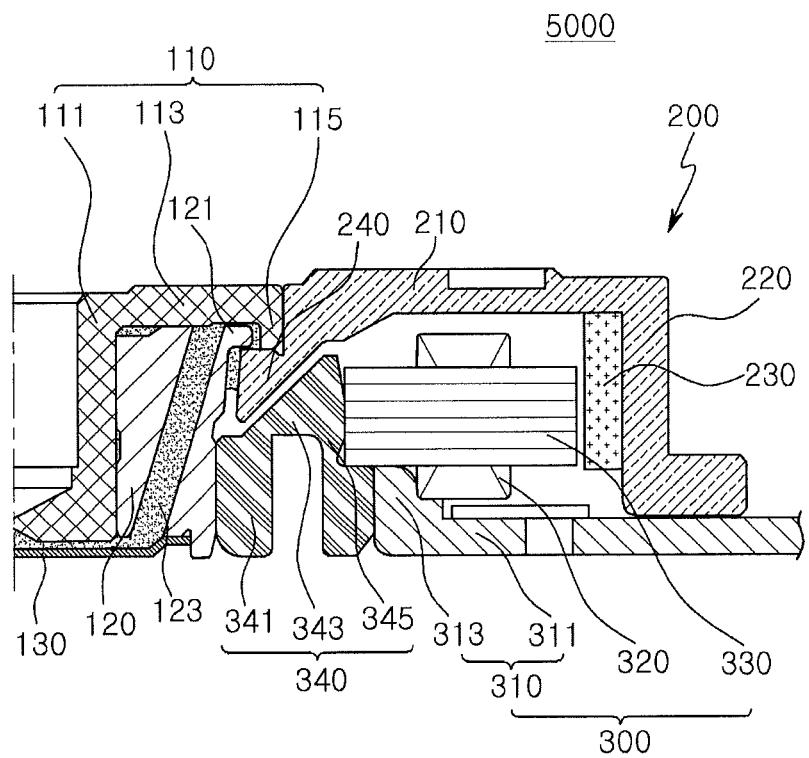
FIG. 17 is a cross-sectional view of half of a spindle motor according to a fifth embodiment of the present invention.
Figure 18:
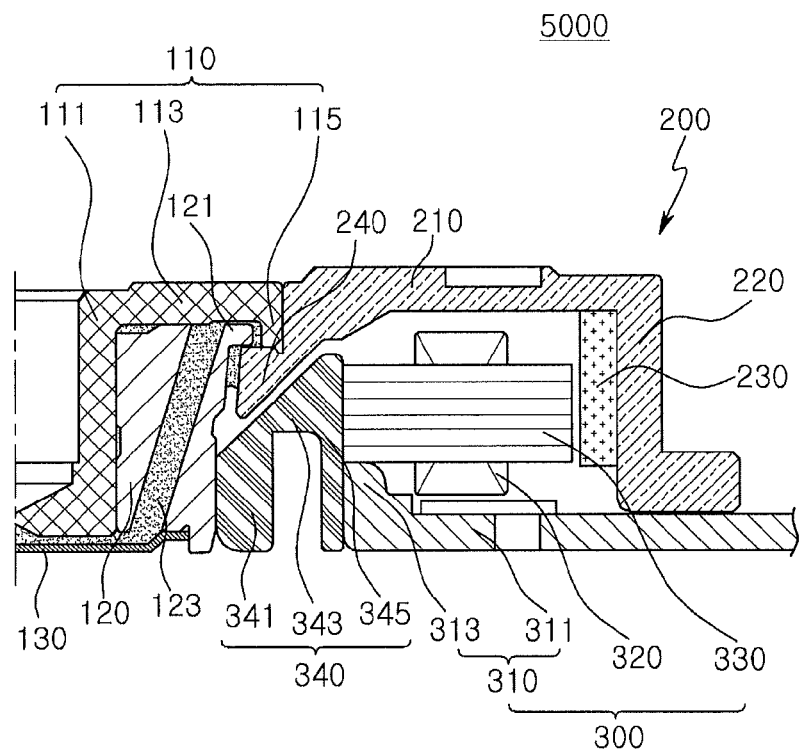
FIG. 18 is a cross-sectional view of half of a spindle motor according to the fifth embodiment of the present invention.
Figure 19:
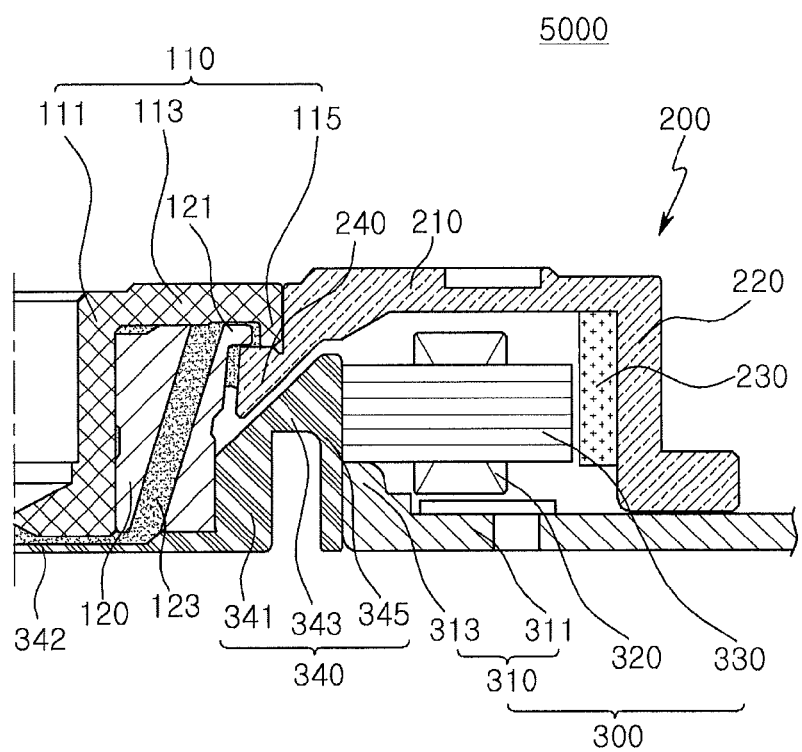
FIG. 19 is a cross-sectional view of half of the spindle motor in which a stator holder and a cover plate are integrally formed according to the fifth embodiment of the present invention.

FIG. 17 is a cross-sectional view of half of a spindle motor according to a fifth embodiment of the present invention. FIG. 18 is a cross-sectional view of half of a spindle motor according to the fifth embodiment of the present invention. FIG. 19 is a cross-sectional view of half of the spindle motor in which a stator holder and a cover plate are integrally formed according to the fifth embodiment of the present invention.

Referring to FIGS. 17 through 19, a spindle motor 5000 according to the fifth embodiment of the present invention is the same as the spindle motor 4000 according to the fourth embodiment of the present invention, except for a base member 310, so a description of components other than the base member 310 will be omitted.

The base member 310 may include a disk portion 311 and a coupling portion 313 extending from an inner end of the disk portion 311 upwardly in the axial direction.

The coupling portion 313 may be coupled to the stator holder 340. In detail, the coupling portion 313 may be coupled to an outer circumferential surface of the installation portion 345 provided in the stator holder 340.

The coupling portion 313 may support a lower surface of the core 330 together with the stator holder 340.

Thus, since the core 330 is supported even by the base member 310 as well as by the stator holder 340, pulling force of the core 330 can be enhanced.

Meanwhile, as illustrated in FIGS. 5, 8, 12, 16, and 19, the stator holder 340 and the cover plate 130 may be integrally formed.

Namely, the stator holder 340 and the cover plate 130 may be coupled as separate members, but in the spindle motor according to an embodiment of the present invention, the stator holder 340 and the cover plate 130 may be integrally formed.

Thus, in comparison to the case in which the stator holder 340 and the cover plate 130 are coupled as separate members, when the stator holder 340 and the cover plate 130 are integrally formed, overall rigidity of the spindle motor can be enhanced and internal components thereof are prevented from being deformed in spite of external impacts potentially applied thereto.

In the case in which the stator holder 340 and the cover plate 130 are integrally formed, the stator holder 340 may include a cover portion disposed below the sleeve 120 such that a gap is maintained between the cover portion 342 and a lower portion of the sleeve 120, a fixed portion 341 coupled to an outer circumferential surface of the sleeve 120, an installation portion 345 to which the core 330 with the coil 320 wound therearound is fixed, and a connection portion 343 connecting an upper end of the fixed portion 341 and an upper end of the installation portion 345.

Through the foregoing embodiments, the spindle motor according to the present invention can have enhanced rigidity, satisfy compactness and thinness requirements, have an increased length of a bearing span. In addition, the presence of the labyrinth sealing portion prevents leakage of a lubricating fluid and an introduction of a foreign object.

As set forth above, in the spindle motor according to embodiments of the invention, rigidity of the spindle motor can be enhanced, and bearing rigidity can be enhanced while implementing a small and thin spindle motor.

Also, leakage of a lubricating fluid can be prevented and a lifespan of the spindle motor can be lengthened.

Also, internal components of the spindle motor can be reduced to simplify a manufacturing process and reduce manufacturing costs.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a sleeve rotatably supporting a shaft;
a rotor coupled to an upper end of the shaft and rotating in conjunction with the shaft;
a stopper portion coupled to a main wall portion protruded from one surface of the rotor and facing an outer circumferential surface of the sleeve;
a stator holder having a fixed portion coupled to an outer circumferential surface of the sleeve, an installation portion to which a core having a coil wound therearound is fixed, and a connection portion connecting an upper end of the fixed portion and an upper end of the installation portion; and
a base member fixedly coupled to the stator holder,
wherein the connection portion includes an inclined surface.

2. The spindle motor of claim 1, wherein the base member has a disk portion and a coupling portion extending from an inner end of the disk portion upwardly in an axial direction.

3. The spindle motor of claim 2, wherein an inner circumferential surface of the coupling portion is coupled to an outer circumferential surface of the fixed portion.

4. The spindle motor of claim 1, wherein an accommodation recess is formed between the fixed portion and the installation portion.

5. The spindle motor of claim 4, wherein the base member has a coupling portion extending from an inner end of the disk portion upwardly in the axial direction, and the coupling portion is fixedly disposed in the accommodation recess.

6. The spindle motor of claim 1, wherein a fluid-air interface of a lubricating fluid is formed between an outer circumferential surface of the sleeve and an inner circumferential surface of the stopper portion.

7. The spindle motor of claim 6, wherein the outer circumferential surface of the sleeve and the inner circumferential surface of the stopper portion are tapered to seal a lubricating fluid therebetween.

8. The spindle motor of claim 1, wherein a micro-gap is formed between a lower surface of the stopper portion and an upper surface of the connection portion and widened outwardly in a radial direction.

9. The spindle motor of claim 1, wherein the stator holder further includes a bent portion extending from a lower end of the installation portion outwardly in the radial direction.

10. The spindle motor of claim 1, wherein the stator holder further includes an outer wall portion extending from an outer end of the connection portion upwardly in the axial direction.

* * * * *